United States Patent
Nádas et al.

(10) Patent No.: US 10,367,739 B2
(45) Date of Patent: Jul. 30, 2019

(54) LOAD BALANCING AMONG ALTERNATIVE PATHS

(71) Applicant: Telefonaktiebolaget L M Ericsson (publ), Stockholm (SE)

(72) Inventors: Szilveszter Nádas, Budapest (HU); János Harmatos, Budapest (HU); Sándor Rácz, Cegléd (HU); Zoltán Richárd Turányi, Szentendre (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 164 days.

(21) Appl. No.: 14/469,673

(22) Filed: Aug. 27, 2014

(65) Prior Publication Data

US 2015/0063121 A1    Mar. 5, 2015

(30) Foreign Application Priority Data

Aug. 30, 2013  (EP) .................................... 13182415

(51) Int. Cl.
*H04L 12/825*    (2013.01)
*H04L 12/803*    (2013.01)
(Continued)

(52) U.S. Cl.
CPC ............ *H04L 47/125* (2013.01); *H04L 45/24* (2013.01); *H04L 45/22* (2013.01); *H04L 47/2433* (2013.01);
(Continued)

(58) Field of Classification Search
CPC ....... H04L 47/10; H04L 47/127; H04L 47/11; H04L 45/24; H04L 45/22; H04L 47/125; H04L 47/26; H04L 47/29; H04L 47/2433
(Continued)

(56) References Cited

U.S. PATENT DOCUMENTS 7,706,255 B1 *  4/2010  Kondrat ................. H04L 47/10
                                                                    370/219
2005/0018690 A1 *  1/2005  Kilkki ..................... H04L 47/10
                                                                    370/395.6
(Continued)

FOREIGN PATENT DOCUMENTS

EP    0465090 A1    1/1992
GB    2467424 A     8/2010

OTHER PUBLICATIONS

Paganini, Fernando et al., "A Unified Approach to Congestion Control and Node-Based Multipath Routing", IEEE/ACM Transactions on Networking, vol. 17, No. 5, Oct. 2009. 1413-1426.

(Continued)

*Primary Examiner* — Un C Cho
*Assistant Examiner* — Kenan Cehic
(74) *Attorney, Agent, or Firm* — Murphy, Bilak & Homiller, PLLC

(57) ABSTRACT

A method and a transmitting node for redirecting of a flow of data packets to a path of alternative paths, and a method and a receiving node for enabling redirection of a flow of data packets to a path of alternative paths, where data packets are marked with a value indicating the importance of the data packets. The method for directing directs one or more flows of data packets for the alternative paths, wherein data packets marked with a higher value are prioritized over data packets marked with a lower value. Based on feedback information, the transmitting node redirects a flow of data packets to a second path of the alternative paths, if the metric of congestion indicates a higher congestion on the first path than on the second path.

3 Claims, 4 Drawing Sheets

(51) Int. Cl.
*H04L 12/707* (2013.01)
*H04L 12/851* (2013.01)
*H04L 12/801* (2013.01)

(52) U.S. Cl.
CPC .......... *H04L 47/2441* (2013.01); *H04L 47/26* (2013.01); *H04L 47/29* (2013.01)

(58) Field of Classification Search
USPC ................................................ 370/229–240
See application file for complete search history.

(56) References Cited

U.S. PATENT DOCUMENTS

| | | | |
|---|---|---|---|
| 2005/0207439 A1* | 9/2005 | Iyengar | H04L 67/322 370/428 |
| 2005/0276217 A1* | 12/2005 | Gadgil | H04L 45/28 370/225 |
| 2008/0049753 A1* | 2/2008 | Heinze | H04L 12/5695 370/392 |
| 2008/0253381 A1 | 10/2008 | Ward et al. | |
| 2009/0304007 A1 | 12/2009 | Tanaka et al. | |
| 2010/0329134 A1* | 12/2010 | Doppler | H04L 1/0026 370/252 |
| 2012/0051216 A1* | 3/2012 | Zhang | H04L 47/12 370/230 |

OTHER PUBLICATIONS

Sole-Pareta, Josep et al., "Adaptive Multipath Routing of Connectionless Traffic in an ATM Network", IEEE 1995, 1626-1630.

\* cited by examiner

LOAD BALANCING AMONG ALTERNATIVE PATHS

RELATED APPLICATION

This application claims the benefit, under 35 U.S.C. § 120, of the previous filing of European Patent Application No. 13182415.3, filed 30 Aug. 2013.

TECHNICAL FIELD

This disclosure relates to load balancing among alternative paths. In more particular, it relates to a method and a transmitting node for directing of data packets to alternative paths. The disclosure also relates to a method and a receiving node for enabling directing of data packets to alternative paths.

BACKGROUND

Load balancing among multiple transmission paths is a common technique to spread load and achieve higher overall throughput and network utilization.

When multiple transmission links are available, there is an incentive to use them all. This results in higher throughput for the particular traffic flow, since two or more pieces of capacity are utilized instead of one.

However, it is often not known how to spread the load among multiple transmission paths in order to fully utilize the opportunities of load balancing.

Basic load balancing can improve a total throughput over a network. In transport networks, for instance, there are various ways to achieve multiple transmission paths towards the same destination. The most simple and common way is to use multiple parallel links between two switching nodes. Multiple parallel links increase the overall capacity and also provide protection against the loss of any one of the links. One example is a link aggregation group (LAG).

A more sophisticated way is an equal-cost multipath (ECMP) strategy, where alternative paths can have a length of multiple hops. Another way is to explicitly set-up alternative paths.

Current deployments of load balancing are very simple. Even if ECMP is enabled, the control plane of current deployments provides no hints on how to distribute data traffic. Today's LAG examples are also typically statically configured, if they do load balancing at all.

There are, however, schemes which distribute load in an adaptive way. These rely on either binary congestion feedback or a feedback related to link utilization along the various paths. In the case of congested links, the quality of experience (QoE) will differ from one link to another, if the number of users differs from one link to another. Also, user differentiation would not be possible.

There is hence a need to provide an alternative load balancing among multiple paths with an improved performance when the multiple paths are congested.

SUMMARY

It is an object of embodiments of the invention to address at least some of the issues outlined above. This object and others are achieved by a transmitting node, a receiving node, a method for redirecting a flow of data packets and a method for enabling redirection of a flow of data packets, according to the appended independent claims, and by the embodiments according to the dependent claims.

According to a first aspect, the invention provides a method in a transmitting node for redirecting a flow of data packets to a path of alternative paths, where the data packets of the flow are marked with a value indicating the importance of the data packets. The method comprises directing one or more flows of data packets for the alternative paths, wherein data packets marked with a higher value indicating the importance of the data packets are prioritized over data packets marked with a lower value. The method also comprises receiving feedback information comprising a metric of congestion for each alternative path, based on a value indicating the importance of the data packets transmitted on each alternative path. In addition, the method comprises redirecting a flow of data packets from a first path of the alternative paths, to a second path of the alternative paths, if the metric of congestion of the first path indicates a higher congestion than the one of the second path.

According to a second aspect, the invention provides a method in a receiving node enabling redirection of a flow of data packets in a transmitting node to a path of alternative paths, where the data packets are marked with a value indicating the importance of the data packets. The method comprises receiving a first and a second amount of the data packets on a first and a second path, respectively, of the alternative paths. The method further comprises determining for each alternative path, feedback information comprising a metric of congestion based on the values indicating the importance of the data packets received on each alternative path. In addition, the method comprises providing to the transmitting node the feedback information for each alternative path.

According to a third aspect, the invention provides a transmitting node for redirecting a flow of data packets to a path of alternative paths, where the data packets are marked with a value indicating the importance of the data packets. The transmitting node comprises means that is adapted to direct one or more flows of data packets for the alternative paths, wherein the data packets marked with a higher value indicating the importance of the data packets are prioritized over data packets marked with a lower value. The transmitting node further comprises means that is adapted to receive feedback information comprising a metric of congestion for each alternative path, based on a value indicating the importance of the data packets transmitted on each alternative path. In addition, the transmitting node comprises means that is adapted to redirect a flow of data packets from a first path of the alternative paths, to a second path of the alternative paths, if the metric of congestion of the first path indicates a higher congestion than the one of the second path.

According to a fourth aspect, the invention provides a receiving node for enabling redirection of a flow of data packets in a transmitting node to a path of alternative paths, where the data packets are marked with a value indicating the importance of the data packets. The receiving node comprises means that is adapted to receive a first and a second amount of the data packets on a first and a second path, respectively, of the alternative paths. The method also comprise means that is adapted to determine for each alternative path feedback information comprising a metric of congestion based on the values indicating the importance of the data packets received on each alternative path. In addition, the receiving node also comprises means that is adapted to provide to the transmitting node the feedback information for each alternative path.

It is an advantage with embodiments of the invention that they provide load balancing that works well at full (100%) utilization, of either or both alternative paths.

It is a further advantage that the value indicating the importance of data packets, of data packets transmitted by the transmitted node to the receiving node can be maximized.

It is advantageous that embodiments honour requirements on quality of service (QoS) of individual flows.

It is also an advantage that the load balancing is state-less, and can therefore be easily scaled.

It is a further advantage with embodiments of the present invention that a QoE can be balanced on the alternative paths, with maintained user differentiation. This implies that a gold customer using a first alternative path can appreciate almost the same QoE as a gold customer using a second alternative path. In addition, on both paths gold users can appreciate a higher QoE than silver users.

BRIEF DESCRIPTION OF THE DRAWINGS

Embodiments will now be described in more detail, and with reference to the accompanying drawings, in which.

DETAILED DESCRIPTION

There is hence a need for an alternative load balancing among multiple parallel paths with an improved performance when the multiple paths are congested. Alternative paths as herein used denote multiple parallel paths.

Techniques described in the background section of the present disclosure fail to take QoS into account in a simple and effective manner.

Embodiments of the present invention take into account the overall desired utility and attempt to maximize the QoS provided by a network comprising a transmitting node and a receiving node.

It is pointed out that the QoS can significantly differ between two network scenarios both having 100% utilization. For example, if less important data packets can be delivered on a first path and more important data packets have to be dropped due to limited resources available on a second path, the total QoS will be less than the total QoS in a desired scenario in which less important data packets are dropped and more important data packets are delivered.

Also, in load balancing one problem is to find out how data traffic is best distributed among multiple alternative paths. Moreover, the capacity of alternative paths can vary, for instance in microwave links with adaptive modulation. Varying capacity is difficult to consider if only the utilization is used to divide the data traffic among the alternative paths.

It is also noted that any alternative path can carry one or more flows other than the flow of data packet to be redirected.

The embodiments of the present invention relate to a solution that is highly automatic, can spread load evenly, takes other data traffic into account and respects QoS, that is, it routes data traffic to maximize the overall QoS achieved by participating nodes.

Embodiments of this invention relate to load balancing between alternative paths, which all start in the same node and all end in the same node.

In the following description, different embodiments of the invention will be described in more detail, with reference to accompanying drawings. For the purpose of explanation and not limitation, specific details are set forth, such as particular examples and techniques in order to provide a thorough understanding.

Figure 1:
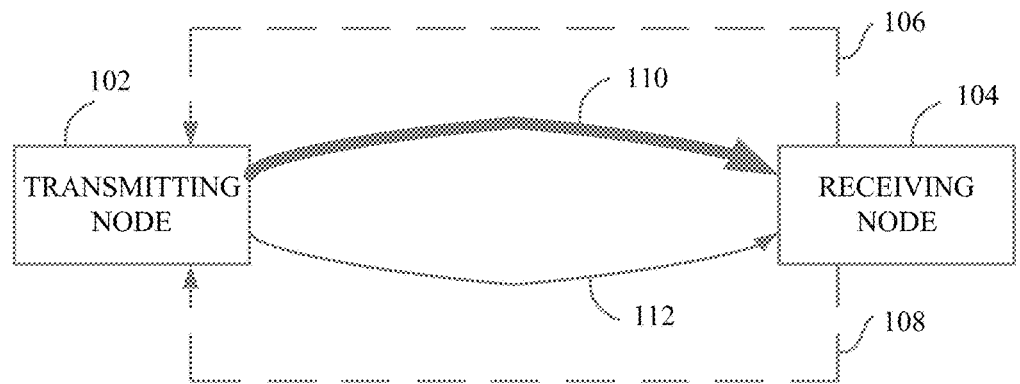
FIGS. 1 and 2 schematically present load balancing among alternative network paths, related to embodiments of the present invention.

FIG. 1 schematically presents two network nodes, a transmitting node 102 and a receiving node 104, which are connected to each other by two alternative paths, a first path 110 and a second path 112.

Path 110 is illustrated by a thick line, whereas path 112 is illustrated by a thin line. The load on first path 110 is high, which herein results in a relatively high congestion. The load on the second path 112 is low, which herein results in a relatively low congestion. The relatively high and low congestion, are accordingly indicated with the thick and thin lines, respectively, in FIG. 1.

The data traffic load on the first and second paths comprises flows of data packets that are marked with a value that indicates the importance of the data packet, for instance, for an operator. Based on flows of data packets served by the first and second paths, the receiving node 104 can calculate a metric congestion for each path.

It is noted that both paths attempts to maximize the total value of transmitted data packets. This means that data packets having a higher value that indicates the importance of the data packet are prioritized over data packets having a lower value indicating the importance of the data packets.

A metric of congestion can be determined as the lowest value of the data packet being transmitted, or served, on the respective path. The receiving node can thus calculate a relatively high metric of congestion for the first path, and a relatively low metric of congestion for the second path. The receiving node 104 can then send feedback information 106, 108 about the first 110 and second 112 path to the transmitting node 102.

Figure 2:
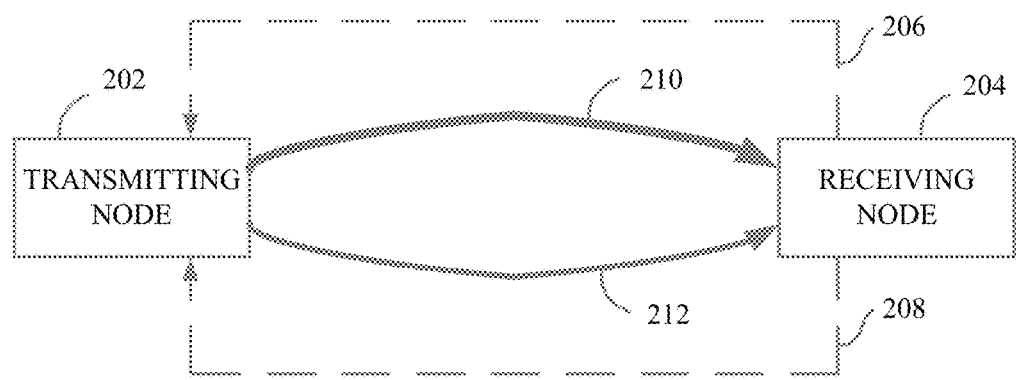

FIG. 2 schematically illustrates the same two network nodes as illustrated in FIG. 1. Transmitting node 202 is thus connected to receiving node 204 by a first 210 and a second 212 alternative path. FIG. 2, however, illustrates a scenario in which feedback information as received from the receiving node has been taken into account.

As the metric of congestion as provided by the receiving node clearly shows a higher congestion on the first path than on the second path, the transmitting node redirects a flow of data packets from the first path 210 to the second path 212, easing the congestion on the first path 210. The first path 210 is therefore illustrated by a somewhat less thick line than the first path 110 in FIG. 1. Similarly, the second path 212 to which the flow of data packets is redirected is illustrated by a somewhat thicker line than the second path 112 in FIG. 1.

The load on the first and second paths is thus more balanced in FIG. 2, as compared to FIG. 1.

Figure 3:
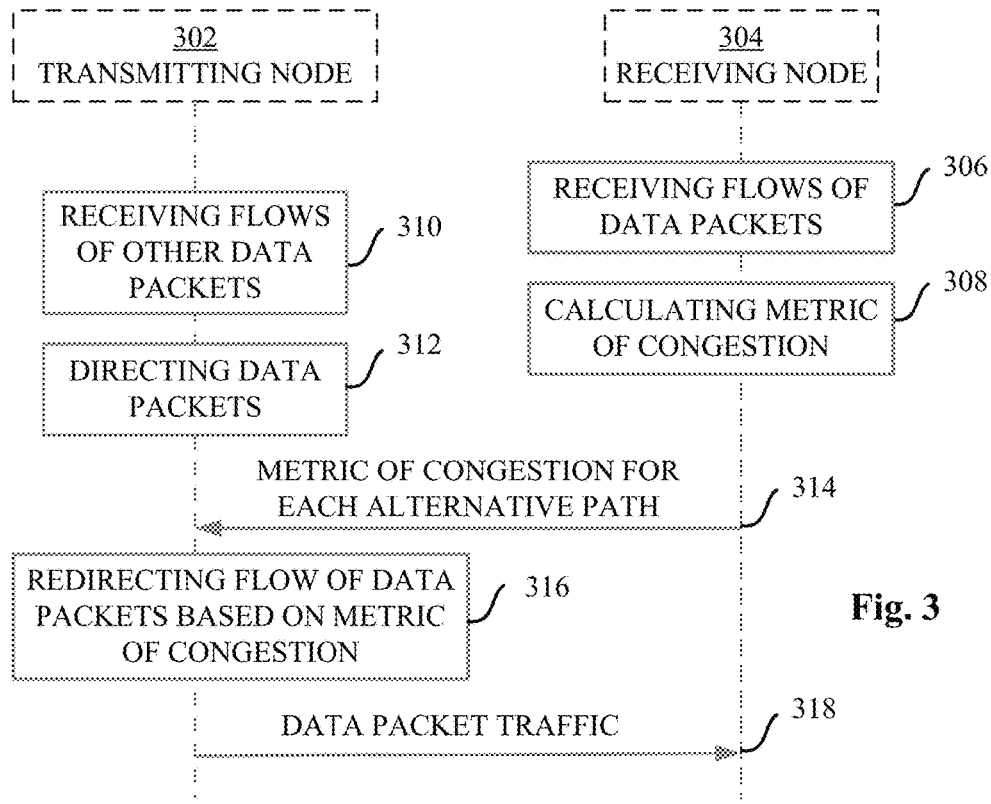
FIG. 3 presents a signalling diagram, related to embodiments of the present invention.

FIG. 3 presents a signaling diagram of signaling between a transmitting node 302 and a receiving node 304 connected to each other by alternative paths.

In 306, the receiving node 304 receives flows of marked data packets from the transmitting node 302 on the alternative paths. The data packets are here marked with a value that indicates the importance of the data packet. One example is the value for an operator, the so called per packet operator value (PPOV). Based on flows of marked data packets received, the receiving node calculates 308 a metric of congestion of each of the alternative paths.

In 310, the transmitting node 302 receives a flow of other marked data packets to send to the receiving node 304. These other marked data packets are thus different from the data packets already received in 306 by the receiving node 304. In 312, the transmitting node 302 directs said other flows of marked data packets among the alternative paths.

In 314, the transmitting node 302 receives feedback information comprising a metric of congestion for each alternative path from the receiving node 304. In 316, the transmitting node 302 redirects a flow of said other flows of marked data packets, to be sent to the receiving node 304, if the metric of congestion of alternative paths differ. In 318, the transmitting node 302 sends flows of data traffic comprising the redirected flow of marked data packets to the receiving node 304.

In order to keep the sequential order of data packets with each flow, data packets within a single flow can be redirected together from one alternative path to another alternative path. After having redirected a flow of data packets, and transmitted the flow, the metric of congestion is updated for each alternative path.

The value that indicates the importance of the data packet, represents the utility that, for instance, an operator gets from delivering one byte of this data packet.

Data packets can be marked at an ingress node of a network, with their value based on the service an operator wants to provide.

Marking of data packets is well-known for a person skilled in the art, and is hence not further described herein.

By transmitting a flow of data packets with a higher value instead of a flow of data packets with a lower value, the total data packet value for each transmitting node can be maximized.

An algorithm that also preserves data packet ordering is as follows. Data packets received by a transmitting node are directed to the back of a single first-in first-out (FIFO) queue for each alternative path. The received data packets will be served from the front of the queue, in the case it is not full. If, however, the queue is full, the value of the incoming data packet is compared with the value of the lowest value data packet in the queue. If the arriving data packet is more valuable than the lowest value packet in the queue, the latter is discarded and the former is added to the back of the queue. If there are several data packets in the queue with one and the same low value, the one closest to the front of the queue is discarded.

It is noted that redirecting a flow of data packets refers to determining a fraction of the number of flows for each available alternative path. Changing the relative load among each alternative path means one or more flows of data packets are shifted from one alternative path to another alternative path.

Moreover, the relative order of signalling within FIG. 3 may differ among embodiments of the present invention. It is however of importance that the transmitting node 302 receives feedback information from the receiving node 304 based on the latest redirection of flow of data packets, before being able to determine whether to redirect another flow of data packets or not.

It should be mentioned that feedback information is determined repetitively, for instance at fixed time intervals. Feedback information may thus also be communicated to the transmitting node 302 at regular intervals.

If the alternative paths have different metrics of congestion, a flow of data packets is redirected from a path having a metric of congestion indicating a higher congestion, to another path having a metric of congestion indicating a lower congestion. After a redirection, the transmitting node transmits the redirected flow of data packets to the receiving node, at which the determining of congestion will then be based on the redirected flow of data packets also.

Figure 4:
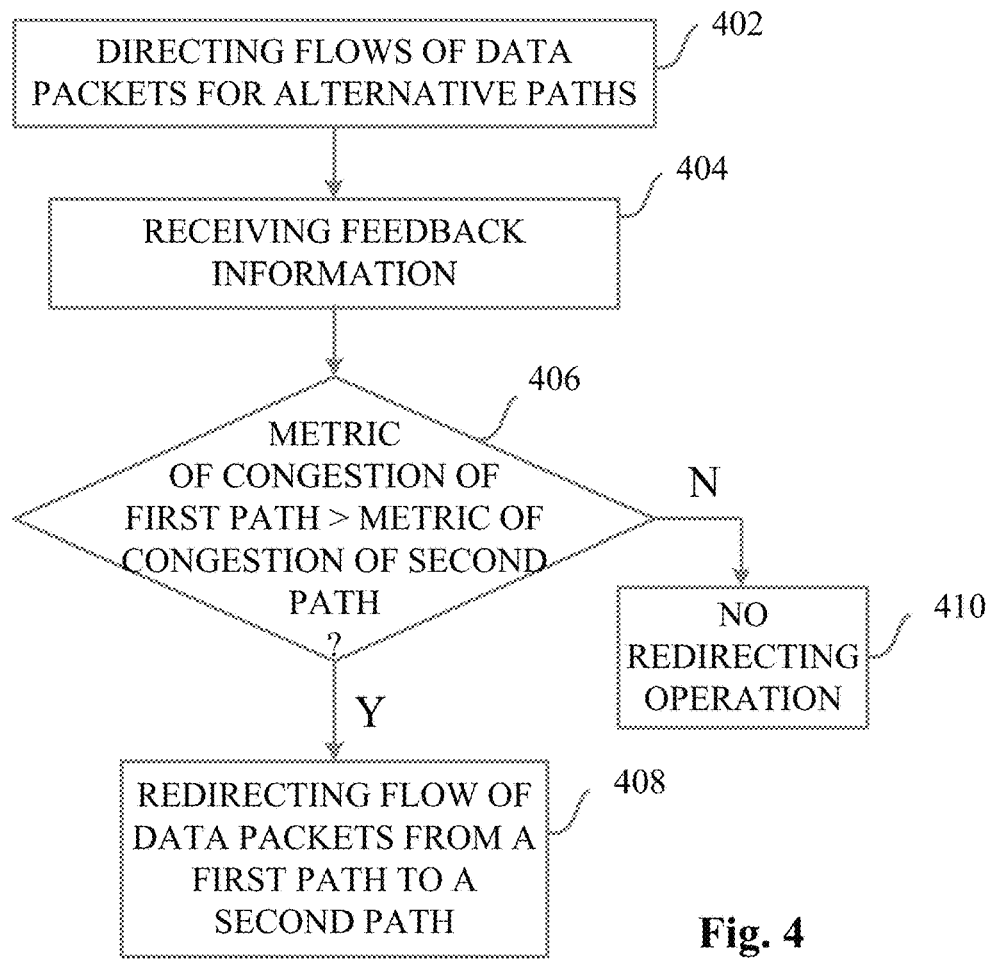
FIGS. 4 and 5 present flow diagrams of methods, according to embodiments of the invention.

FIG. 4 illustrates a flow chart of a method in a transmitting node 102, 202, 302 for redirecting a flow of data packets to a path of alternative paths, where the data packets are marked with a value indicating the importance of the data packets. The method comprises directing 402 one or more flows of data packets for the alternative paths 110, 112, 210, 212, wherein a flow of data packets marked with a higher value indicating the importance of the data packets is prioritized over a flow of data packets marked with a lower value. The method also comprises receiving 404 feedback information comprising a metric of congestion for each alternative path, where the metric of congestion is based on the values indicating the importance of the data packets transmitted on each alternative path. In addition, the method comprises redirecting 408 a flow of data packets from a first path of the alternative paths, to a second path of the alternative paths, if 406 the metric of congestion of the first path indicates a higher congestion than the one of the second path.

If the metric of congestion of the first path equals to the metric of congestion of the second path, no redirection operation is performed, 410.

However, if 406 the metric of congestion of the second path indicates a higher congestion than the one of the first path, the method comprises redirecting 408 a flow of data packets from a second path of the alternative paths, to the first path of the alternative paths.

The metric of congestion may comprise a threshold value, wherein a flow of data packets marked with a value above the threshold value is transmitted, whereas a flow of data packets marked with a value below the threshold value is discarded.

Data packets being redirected may comprise an entire flow of data packets.

The feedback information may be received from a receiving node 104, 204, 304 connected to the transmitting node 102, 202, 302 via the alternative paths, wherein the metric of congestion for each alternative path is determined based on the values indicating the importance of the data packets received on each alternative path.

The prioritizing of data packets within the method may further be based on an expected amount of resources needed to serve said one or more flows of data packets for the alternative paths.

Figure 5:
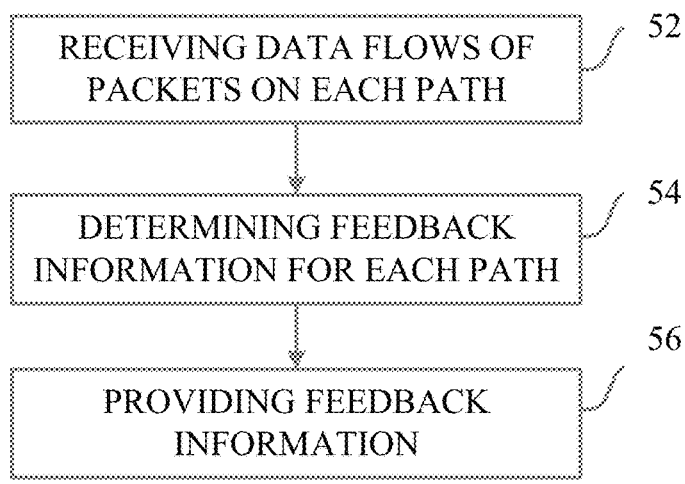

With reference to FIG. 5 a flow chart of a method in a receiving node 104, 204, 304 enabling redirection of a flow of data packets in a transmitting node 102, 202, 302 to a path of alternative paths, where the data packets are marked with a value indicating the importance of the data packets. The method comprises receiving 306, 52 a first and a second fraction of the data packets on a first and a second path, respectively, of the alternative paths. The method further comprises determining 308, 54 for each alternative path feedback information comprising a metric of congestion based on the values indicating the importance of the data packets received on each alternative path. In addition, the method comprises providing 314, 56 to the transmitting node the feedback information for each alternative path.

Since the data traffic on each alternative path is seldom stable, but rather varies over time, the metric of congestion to be calculated can be averaged over time. The feedback information that is determined for each alternative path may hence comprise calculating a percentile of the value of importance of data packets of received flows on each alternative path during a pre-determined time interval. For instance, the 5th percentile of a flow of data packets received during one second, i.e. the lowest 5% of the value of importance for each alternative path, may hence be used.

Hence, an optimal threshold cannot be calculated at any given instance in time. Time averaging over a time scale can thus be implemented.

As indicated above, the lowest value of data packets that can become served by a value maximizing path may be representative to the level of congestion of that path. Under stationary conditions data packets above this threshold value all get served, whereas data packets below it will not.

Using a threshold value to represent the congestion of each alternative path has a number of advantages. The flow capacity of each alternative path reflected in the threshold, and so is the volume of offered data traffic on each alternative path.

Since a data packet having a higher value is prioritized over a data packet having a lower value, the total value of transmitted data packets is maximized. This is clear advantage since the usage of the total flow capacity of alternative paths is optimized in this way. The QoS of the offered data traffic is thus maximized.

Figure 6:
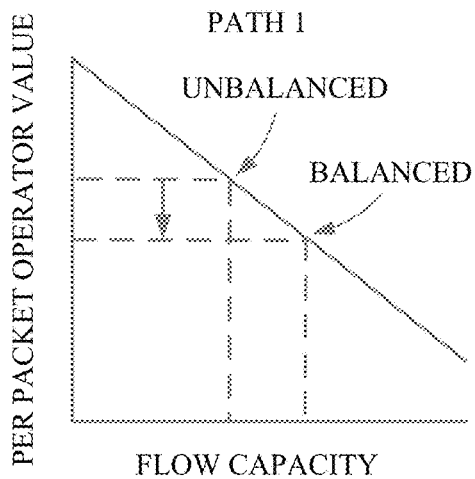
FIGS. 6 and 7 present graphs of a per packet operator value against flow capacity for balanced and unbalanced load, related to embodiments of the present invention.
Figure 7:
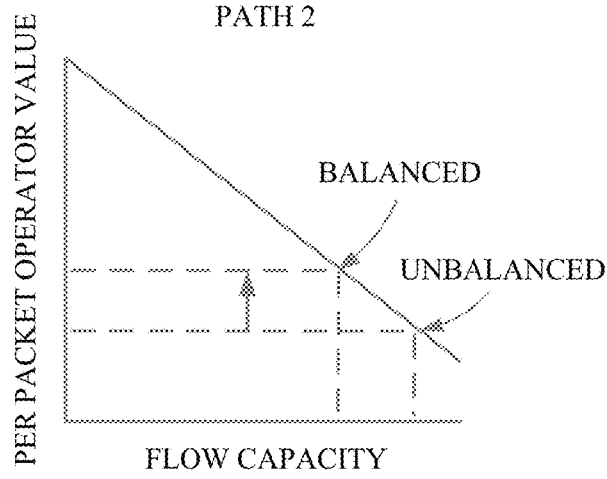

FIGS. 6 and 7 together present graphs of a value per data packet for an operator, here called per packet operator value, against a flow capacity of alternative network paths path 1 and path 2. It is noted that the paths attempt to maximize the total value of transmitted data packets. This is performed by giving priority to data packets having a higher value, over data having a lower value.

In FIGS. 6 and 7, unbalanced positions refer to a case in which there is a difference between a metric of congestion of path 1 and path 2. Herein, congestion refers to a threshold value, indicating the lowest value of the data packet of a flow that is being served on each path. Data packets having a higher value are served, whereas data packets having a lower value are discarded. It is illustrated that path 1 has a higher metric of congestion than path 2 since the flow capacity is smaller. This means that there are data packets that cannot be served by path 1, whereas they could be served by path 2. For this reason, a flow of data packets is redirected from path 1 to path 2. Since path 1 will have fewer data packets to serve the metric of congestion of path 1 decreases. Similarly, since path 2 will have more data packets to serve the metric of congestion of path 2 increases. When redirecting a flow of data packets from an unbalanced case, a more balanced case is entered.

Moreover, in FIG. 7 it is noted that some data packets can no longer be served by path 2 in the more balanced case, as compared to the unbalanced case. By comparing the PPOV of the data packets that can no longer be served by the path having the lowest congestion, and the PPOV of the data packets which can be served after the redirection, it is easily realized that the PPOV of the data packets that can be served is higher than the data packets that can no longer be served. There is thus a positive difference in the PPOV, caused by the redirection of data packets from an alternative path having a higher metric of congestion to another alternative path having a lower metric of congestion.

For example, suppose that the per packet operator values are 70 and 50 for path 1 and path 2, respectively, in the unbalanced case. On path 1 data packets having a PPOV less than 70 are discarded, and data packets having a PPOV less than 50 are discarded on path 2. By redirecting or shifting some data traffic, from path 1 to path 2, the PPOV threshold value of path 1 would decrease, say to 65, and the PPOV threshold value of path 2 would increase to, say 55. The congestion of path 1 would hence decrease whereas the one of path 2 would increase.

The transmission of data packets on path 2 between 50 and 55 is stopped, whereas the transmission of data packets between 55 and 60 on path 1 is started. Hence, transmitting more valuable data packets instead of less valuable data packets increases the total value of the transmitted data. Redirecting or shifting of a flow of data traffic may be performed until the threshold level of the available alternative paths becomes equal or at least more equal. This provides the same or almost the same QoE for the alternative paths, considering flow capacity and background data traffic, i.e. data traffic of other users.

Figure 8:
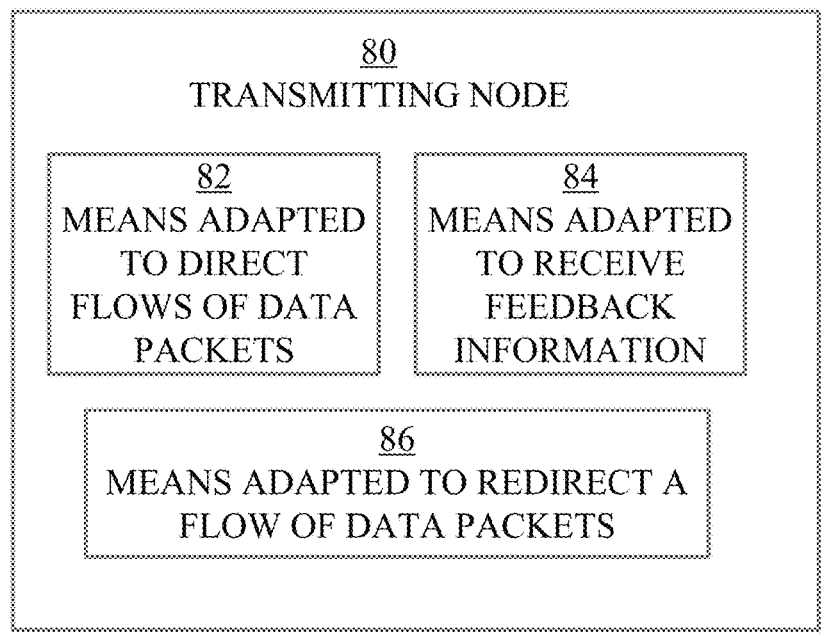
FIGS. 8 and 9 schematically present a transmitting node and receiving node, respectively, according to embodiments of the invention.

FIG. 8 schematically presents a transmitting node 80 for redirecting a flow of data packets to a path of alternative paths, where the data packets are marked with a value indicating the importance of the data packets. The transmitting node comprises means 82 that is adapted to direct 312, 402 one of more flows of data packets for the alternative paths, such that the data packets marked with a higher value indicating the importance of the data packets are prioritized over data packets marked with a lower value. Means 82 includes transmitter circuitry that may be part of, for example, network interface circuitry configured for connection to a network interface. One example of the network interface is an Ethernet interface, but the network interface may support one or more other physical, data link, and/or network layers. Means 82 further includes processing circuitry configured to control the transmitter circuitry to direct one or more flows of data packets for the alternative paths, such that the data packets marked with a higher value indicating the importance of the data packets are prioritized over data packets marked with a lower value. The processing circuitry may be implemented as digital hardware, as a processor coupled to a memory storing program instructions for execution by the processor, or as a combination of both.

The transmitting node further comprises means 84 that is adapted to receive 314, 404 feedback information comprising a metric of congestion for each alternative path, wherein the metric of congestion is based on values indicating the importance of the data packets transmitted on each alternative path. Means 84 includes receiver circuitry that may be part of, for example, the network interface circuitry configured for connection to a network interface and discussed above. Means 84 further includes processing circuitry configured to control the receiver circuitry to receive feedback information comprising a metric of congestion for each alternative path, wherein the metric of congestion is based on values indicating the importance of the data packets transmitted on each alternative path. Once again, this processing circuitry may be implemented as digital hardware, as a processor coupled to a memory storing program instructions for execution by the processor, or as a combination of both. All or part of the hardware making up the processing circuitry controlling the receiver circuitry may be common to the hardware that forms the processing circuitry controlling the transmitter circuitry, in some embodiments.

In addition, the transmitting node comprises means 86 that is adapted to redirect 316, 408 a flow of data packets from a first path of the alternative paths, to a second path of the alternative paths, if the metric of congestion of the first path indicates a higher congestion than the one of the second path. Means 86 comprises processing circuitry that is operatively coupled to the processing circuitry of means 82 and 84, and which is configured to redirect a flow of data packets from a first path of the alternative paths, to a second path of the alternative paths, if the metric of congestion of the first path indicates a higher congestion than the one of the second path. Once more, this processing circuitry may be implemented as digital hardware, as a processor coupled to a memory storing program instructions for execution by the processor, or as a combination of both, and may share hardware with the processing circuitry for means 82 and/or 84, in some embodiments.

The means 84 adapted to receive feedback information, may be adapted to receive a metric of congestion comprising a threshold value, wherein a flow of data packets marked with a value above the threshold value is transmitted, whereas data packets marked with a value below the threshold value are discarded.

The means 86 adapted to redirect may be adapted to redirect an entire flow of data packets.

The means 84 adapted to receive feedback information, may be adapted to receive feedback information from a receiving node connected to the transmitting node via the alternative paths, wherein the metric of congestion for each alternative path is determined based on the values indicating the importance of the data packets received on each alternative path.

The means 86 adapted to redirect may be adapted to calculate a realized value as the value indicating the importance of the data packets divided by an expected amount of resources needed to serve the data packets, and wherein data packets having a higher realized value are prioritized over data packets having a lower realized value, whereby the realized value of served data packets is maximized.

A realized value within the method on a transmitting node may be calculated as the value indicating the importance of the data packets divided by the expected amount of resources, and wherein data packets having a higher realized value are prioritized over data packets having a lower realized value, whereby the realized value of served data packets are maximized.

As noted above, the goal of a transmitting node is to deliver as high a total value as possible. Each alternative path connected to the means 86 adapted to redirect strives to serve packets of higher values to achieve this goal. In case of load balancing this goal can be achieved by splitting the number of flows of data packets among the alternative paths, which results in equal or almost equal congestion level among the alternative paths.

Therefore, if the means adapted to redirect data packets, which may be realized by a load balancer, determine differences in the congestion level, and hence notices that data packets with value below the highest threshold are discarded in the most congested path, the means adapted to redirect shall redirect a flow of data packets—preferably in relatively small steps. Is this way, the numbers of flows on each alternative path are changed, to shift a flow of data packets to a lower congestion alternative path from a higher congestion alternative path.

It is noted that feedback information may be sent from a receiving node comprising means adapted to determine feedback information periodically or when the metric of congestion changes significantly.

It may be assumed that the means to redirect data packets can split the data traffic in sufficiently small pieces, for instance, by being able to redirect small micro-flows among the alternative paths. The load balancing is hence preferably performed in small steps until the metric of congestion of alternative paths is equal or substantially equal.

However, it is noted that the load balancing ratio shall not be changed too quickly, in order to avoid actions by the means to redirect a flow of data packets before feedback information is received from a receiving node based on earlier transmitted flows of data packets.

Figure 9:
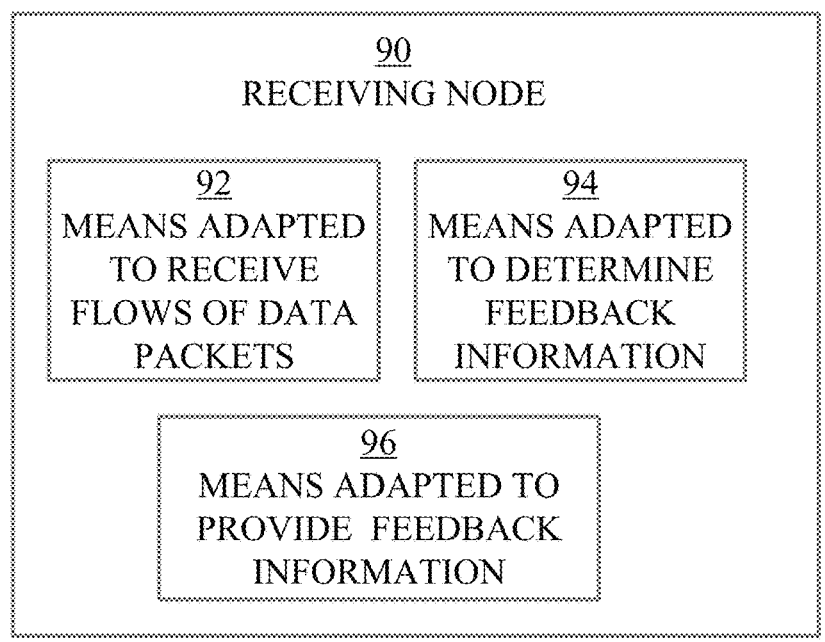

FIG. 9 schematically presents a receiving node 90 for enabling redirection of a flow of data packets in a transmitting node to a path of alternative paths, where the data packets are marked with a value indicating the importance of the data packets. The receiving node comprises means 92 that is adapted to receive 306, 52 a first and a second amount of the data packets on a first and a second path, respectively, of the alternative paths. Means 92 includes receiver circuitry that may be part of, for example, network interface circuitry configured for connection to a network interface, such as an Ethernet interface. Means 92 further includes processing circuitry configured to control the receiver circuitry to receive a first and a second amount of the data packets on a first and a second path, respectively, of the alternative paths. The processing circuitry may be implemented as digital hardware, as a processor coupled to a memory storing program instructions for execution by the processor, or as a combination of both.

The receiving node 90 also comprise means 94 that is adapted to determine 308, 54 for each alternative path feedback information comprising a metric of congestion based on the values indicating the importance of the data packets received on each alternative path. More particularly, means 94 includes processing circuitry configured to determine, for each alternative path, feedback information comprising a metric of congestion based on the values indicating the importance of the data packets received on each alternative path. Once again, this processing circuitry may be implemented as digital hardware, as a processor coupled to a memory storing program instructions for execution by the processor, or as a combination of both. All or part of the hardware making up the processing circuitry controlling the receiver circuitry may be common to the hardware that forms the processing circuitry controlling the receiver circuitry, in some embodiments.

In addition, the receiving node also comprises means 96 that is adapted to provide 314, 56 to the transmitting node the feedback information for each alternative path. Means 96 comprises transmitter circuitry and processing circuitry that is operatively coupled to the processing circuitry of means 92 and 94. The processing circuitry is configured to control the transmitter circuitry and to provide, to the transmitting node, the feedback information for each alternative path. Once more, this processing circuitry may be implemented as digital hardware, as a processor coupled to a memory storing program instructions for execution by the processor, or as a combination of both, and may share hardware with the processing circuitry for means 92 and/or 94, in some embodiments.

The means 94 adapted to determine 308, 54 for each alternative path feedback information, may further be adapted to calculate a percentile of the value of importance of data packets of flows received during a pre-determined time interval on each alternative path.

As seen in the above description of FIGS. 8 and 9, in several embodiments of the invention a processing circuit is adapted, using suitable program code stored in program storage memory, for example, to carry out one or several of the techniques described above, including one or more of the steps illustrated in FIGS. 3, 4, and 5. Of course, it will be appreciated that not all of the steps of these techniques are necessarily performed in a single microprocessor or even in a single module. Thus, embodiments of the presently disclosed techniques include computer program products for application in a user terminal as well as corresponding computer program products for application in a base station apparatus.

Embodiments of the present invention have the following advantages:

They provide load balancing that works well at full (100%) utilization, of either or both alternative paths.

The value of data packets transmitted by the transmitted node to the receiving node can be maximized.

Embodiments honour requirements on QoS of individual flows, for example service flows, user flows or other traffic aggregate flows.

Equal bandwidth sharing among all flows of data packets by using all alternative paths can be realized. Embodiments can further realize weighted and general resource sharing. Since load balancing of embodiment is state-less, it can easily be scaled.

It may be further noted that the above described embodiments are only given as examples and should not be limiting to the present invention, since other solutions, uses, objectives, and functions are apparent within the scope of the invention as claimed in the accompanying patent claims.

ABBREVIATIONS

ECMP Equal-cost multipath
LAG Link aggregation group
QoE Quality of experience
QoS Quality of service

The invention claimed is:

1. A method in a receiving node enabling redirecting of a flow of data packets in a transmitting node to a path of alternative paths, where each data packet is marked with a value indicating the importance of the data packet, the method comprising:
receiving a first and a second amount of the data packets on a first and a second path, respectively, of the alternative paths;
determining a metric of congestion for each alternative path, based on the values indicating the importance of the data packets received on each alternative path; and
providing to the transmitting node the metric of congestion for each alternative path; wherein determining the metric of congestion for each alternative path comprises calculating a percentile of the value of importance of the first and second amount of data packets received during a pre-determined time interval on the first and the second path, respectively.

2. A receiving node for enabling redirection of a flow of data packets in a transmitting node to a path of alternative paths, where the data packets are marked with a value indicating the importance of the data packets, the receiving node comprising
a receiving circuit,
a transmitting circuit, and
a processing circuit adapted to:
control the receiving circuit to receive a first and a second amount of the data packets on a first and a second path, respectively, of the alternative paths;
determine a metric of congestion for each alternative path, based on the values indicating the importance of the data packets received on each alternative path; and
provide to the transmitting node, via the transmitting circuit, the metric of congestion for each alternative path;
wherein the processing circuit is adapted to determine the metric of congestion for each alternative path by calculating a percentile of the value of importance of the first and second amount of data packets received during a pre-determined time interval on the first and the second path, respectively.

3. A receiving node for enabling redirection of a flow of data packets in a transmitting node to a path of alternative paths, where the data packets are marked with a value indicating the importance of the data packets, the receiving node comprising:
means for receiving a first and a second amount of the data packets on a first and a second path, respectively, of the alternative paths;
means for determining a metric of congestion for each alternative path, based on the values indicating the importance of the data packets received on each alternative path; and
means for providing, to the transmitting node, the metric of congestion for each alternative path;
wherein the means for determining a metric of congestion for each alternative path is adapted to determine the metric of congestion by calculating a percentile of the value of importance of the first and second amount of data packets received during a pre-determined time interval on the first and the second path, respectively.

* * * * *